United States Patent
Barbey et al.

(10) Patent No.: US 6,748,236 B1
(45) Date of Patent: Jun. 8, 2004

(54) SYSTEM FOR USING A GSM MOBILE TELEPHONE IN A DECT MOBILE COMMUNICATION NETWORK

(75) Inventors: Jean-Pierre Barbey, Cergy (FR); Jean-François Criqui, Asnieres (FR); Jean-René Rousseau, Neuville S/Oise (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/506,959

(22) Filed: Feb. 18, 2000

(30) Foreign Application Priority Data

Feb. 22, 1999 (FR) .............................. 99 02183

(51) Int. Cl.⁷ .............................. H04B 1/40; H04Q 7/20; H04M 1/00
(52) U.S. Cl. ................ 455/552.1; 455/47.1; 455/426.1; 455/462
(58) Field of Search ................ 455/422, 424, 455/426, 462, 463, 465, 550, 552, 553, 555, 561, 425, 426.1, 426.2, 432.2, 443–445, 41.2, 550.1, 552.1, 553.1, 74, 74.1

(56) References Cited

U.S. PATENT DOCUMENTS

| | | | | | |
|---|---|---|---|---|---|
| 5,384,824 | A | * | 1/1995 | Alvesalo | 379/59 |
| 5,737,703 | A | * | 4/1998 | Byrne | 455/442 |
| 5,878,343 | A | * | 3/1999 | Robert et al. | 455/424 |
| 5,898,931 | A | * | 4/1999 | I'Anson et al. | 455/560 |

FOREIGN PATENT DOCUMENTS

| | | | | |
|---|---|---|---|---|
| EP | 0 849 965 A1 | | 6/1998 | |
| WO | WO 97/12488 | | 4/1997 | |
| WO | WO 97/48243 | * | 12/1997 | H04Q/7/20 |

* cited by examiner

Primary Examiner—William Trost
Assistant Examiner—Meless Zewdu
(74) Attorney, Agent, or Firm—Sughrue Mion, PLLC

(57) ABSTRACT

A system enabling use of mobile telephone terminals to a first standard in a private telecommunication network to a second standard includes a GSM radio transceiver, a DECT radio transceiver and a converter for applying a GSM terminal declaration and location procedure. The system converts between the signaling protocol standardized by the GSM and a DECT/GAP signaling protocol accepted by the private automatic branch exchange. If necessary, it transcodes between the GSM speech code and a speech code accepted by the private automatic branch exchange.

4 Claims, 2 Drawing Sheets

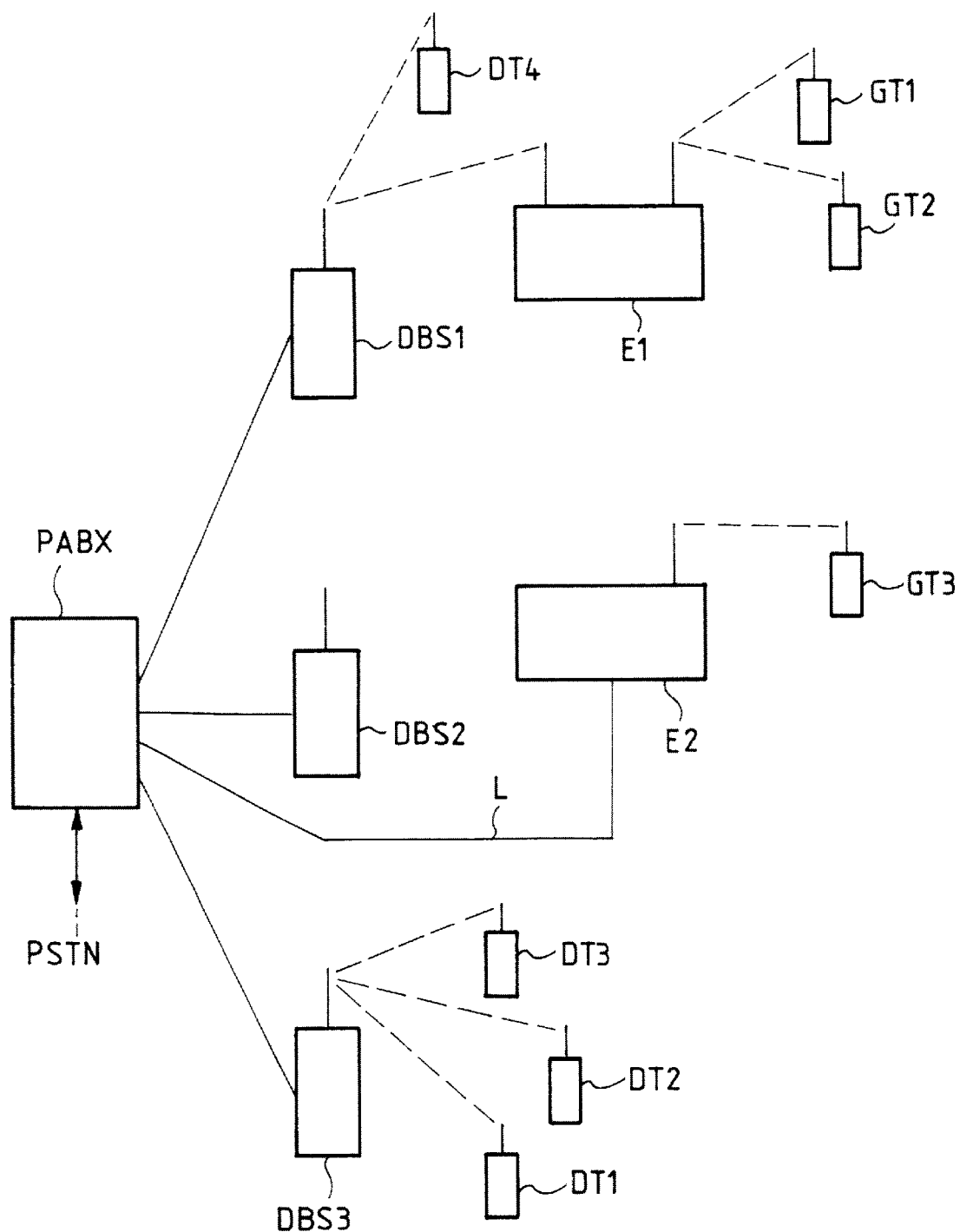
FIG_1

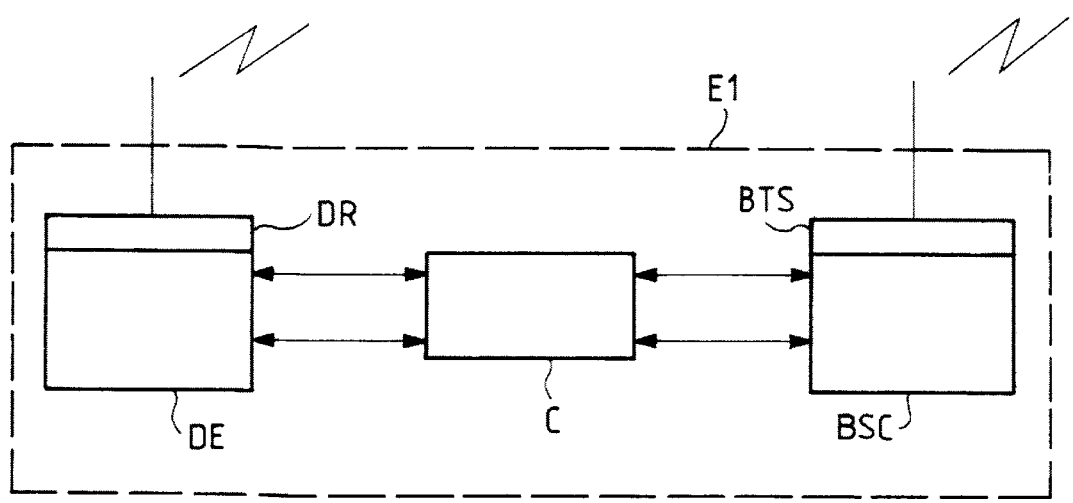
FIG_2

SYSTEM FOR USING A GSM MOBILE TELEPHONE IN A DECT MOBILE COMMUNICATION NETWORK

BACKGROUND OF THE INVENTION

1. Field of the invention

The invention relates to a system enabling use of GSM mobile telephones in a DECT mobile telephone network. A DECT mobile telephone network is conventionally used to enable employees of a business to use the services of a private automatic branch exchange with the benefit of some degree of mobility within the site of the business. A network of this kind includes a private automatic branch exchange, transceiver stations referred to as DECT base stations, DECT mobile telephone terminals and possibly fixed telephone terminals.

2. Description of the prior art

A network of the above kind enables some mobility of employees within the premises on a site of the business. Some employees are required to leave the site, however. To be able to be reached virtually wherever they are, each carries a GSM mobile telephone terminal with a subscription to a GSM public network. They are therefore required to use at least two types of terminal according to whether they are on a site of the business or off the site.

The multiplicity of terminals for the same employee is not practicable, in particular because of the multiplicity of numbers. Also, employees are tempted to use only their GSM terminal, although calls then cost more than calls via the DECT private network and even though the GSM public network does not provide all the services that can be obtained from the private automatic branch exchange of a business. Furthermore, users outside a business are tempted to call the employees of the business via their GSM terminals, and not via the fixed or DECT terminals, to maximize the chances of reaching them. It is therefore desirable for the employees of a business to be able to use their GSM terminals via the private network of the business.

The object of the invention is to enable the employees of a business to use their GSM terminals within the business at the same cost and with the same services as if they were DECT terminals and to enable properly authorized outside visitors to use their GSM terminals as DECT terminals of the business, to access the fixed public network via the private automatic branch exchange of the business, or to be called via the fixed public network.

SUMMARY OF THE INVENTION

In a first aspect, the invention provides a system enabling use of mobile telephone terminals to a first standard in a private telecommunication network to a second standard, the private network including:

- at least one private automatic branch exchange,
- mobile telephone terminals to the second standard,
- base stations to the second standard having input-output ports connected to input-output ports of the private automatic branch exchange, the input-output ports having an interface specific to the base stations;

which system includes a radio transceiver to the first standard, a radio transceiver to the second standard and a converter for carrying out:

- a declaration and location procedure in the private network for terminals to the first standard; and
- conversion between a signaling protocol to the first standard and a signaling protocol accepted by the private automatic branch exchange.

In a second aspect, the invention provides a system enabling use of mobile telephone terminals to a first standard in a private telecommunication network to a second standard, the network including:

- at least one private automatic exchange,
- mobile telephone terminals to the second standard,
- base stations to the second standard having input-output ports connected to input-output ports of the private automatic branch exchange, the input-output ports having an interface specific to the base stations to the second standard;

which system includes a radio transceiver to the first standard, a cable link to a private automatic branch exchange of the private network and a converter for carrying out:

- a declaration and location procedure in the private network for terminals to the first standard, and
- conversion between the signaling protocol to the first standard and a signaling protocol accepted by the private automatic branch exchange.

The above systems are seen as base stations to the first standard by the terminals to the first standard and each is seen as n terminals to the second standard by the private network if there are n terminals to the first standard communicating with one of the systems.

The invention will be better understood and other features of the invention will become apparent from the following description and the accompanying drawings.

BRIEF DESCRIPTION OF THE DRAWINGS

FIG. 1 is a block diagram of one example of a DECT private network including two embodiments of the system according to the invention.

FIG. 2 is a block diagram of one embodiment of a system according to the invention.

DETAILED DESCRIPTION OF THE PREFERRED EMBODIMENTS

The private network PN shown in FIG. 1 includes:

- a private automatic branch exchange PABX,
- DECT type base stations: DBS1, DBS2, DBS3 connected to the private automatic branch exchange PABX, and
- two systems E1 and E2 according to the invention.

DECT terminals DT1, DT2, DT3, DT4 communicate with the DECT base stations DBS1, DBS2, DBS3 via radio links to the DECT standard. The site of the business concerned is also served by the systems E1 and E2 according to the invention, which can establish radio links to the GSM standard with the standard GSM terminals GT1, GT2, GT3. The system E1 is connected to the private network PN by a radio link to the GSM standard, established with a DECT base station, for example DBS1. The system E2 is connected to the private network PN via a cable link L. The private automatic branch exchange PABX is connected in particular to a fixed public switched telephone network PSTN.

The GSM terminals can be used:

- either conventionally, i.e. to communicate via a GSM public network, with access to all of the services provided by that GSM public network;
- or to choose the private network PN, to be located within that network and to communicate with the private network PN and with the fixed public switched telephone network PSTN via the private network PN, which enables them to benefit for all of the services of the private network PN, in particular: local calls with other fixed or mobile terminals of the private network PN and calls via the fixed public switched telephone network PSTN. To use the private network PN, the user of a GSM terminal must first declare their GSM terminal, once and for all, to the private network PN, by entering a particular number and a particular code on the terminal's keypad. Declaring the systems E1 and E2 in this way enables this right of access to be assigned to a list of users who are employees of the business and some visitors.

For each of the GSM terminals considered to belong to the private network PN, i.e. those belonging to the business and those of properly declared visitors, each system E1 and E2 stores in memory:

the international mobile subscriber identity (IMSI) and the corresponding temporary mobile subscriber identity (TMSI), the DECT identity referred to as international portable user identity (IPUI), which is used in the private automatic branch exchange PABX, and the directory number, the IMSI/directory number relation, the IPUI/directory number relation, and optionally, the identity of the company that owns the terminal.

As far as the private automatic branch exchange PABX is concerned, it is exactly as if it were dealing with DECT terminals via a DECT type base station, such as DBS1, DBS2 or DBS3, and as far as the GSM terminals GT1, GT2, GT3 are concerned it is exactly as if they were communicating with a GSM base transceiver station of a GSM public network.

FIG. 2 is a block diagram of an embodiment of the system E1 according to the invention. This embodiment includes:

a radio interface DR to the DECT standard;

a system DE connected to the radio interface DR and emulating n DECT terminals, n being the maximum number of GSM terminals that can be served by the system E1;

a GSM base transceiver station BTS constituting a GSM radio interface having the necessary capacity to communicate with n GMS terminals;

a GSM base station controller BSC connected to the base transceiver station BTS; and a converter C connecting the system DE and the base station controller BSC.

The converter C has the following functions:

declaring n GSM terminals, the converter C and the system DE behaving like n DECT terminals vis a vis the base station DBS1;

transcoding between the GSM speech code (16 kbit/s) and a speech code accepted by the private automatic branch exchange PABX (64 kbit/s);

converting between the CM signaling protocol standardized by the GSM and the DECT/GAP signaling protocol accepted by the private automatic branch exchange PABX; and declaring GSM terminals of visitors.

During the location procedure, the converter C does not store anything in its memory and forwards the request from the terminal to the private automatic branch exchange PABX.

The converter C is optionally used to encrypt calls between the GSM terminals GT1, GT2, GT3, etc. and the system E1 without having access to the secret encryption algorithm of each terminal. A prior manual operation supplies to the subscriber identity module (SIM) card of the GSM terminal a random number and a secret key for the latter to calculate, using its secret algorithm, a result which is a function of the random number and the key. For each identifier IMSI of the GSM terminal, the converter C stores in memory the random number, the secret key and the result. To start encrypting a call, the converter C sends the terminal the secret key and the random number.

The system E2 differs from the system E1 only in that it does not have a radio interface DR to the DECT standard. It exchanges DECT frames directly with the private automatic branch exchange PABX over the cable link L.

There is claimed:

1. A system enabling use of mobile telephone terminals employing a first standard in a private telecommunication network which employs a second standard, the the private network comprising at least one private automatic branch exchange, a plurality of mobile telephone terminals employing the second standard, and a plurality of base stations employing the second standard having input-output ports connected to input-output ports of the private automatic branch exchange, said input-output ports having an interface specific to said base stations the system comprising:

a first radio transceiver employing said first standard and connected via a wireless communication link to said mobile terminals employing said first standard;

a base station controller employing said first standard and connected to said first radio transceiver;

a second radio transceiver employing said second standard and connected via a wireless communication link to said base stations employing said second standard;

a terminal emulation system connected to said second radio transceiver employing said second standard, said terminal emulation system emulating terminals employing said second standard; and a converter communicably linked between said base station controller and said terminal emulation system, said converter configured to:

perform a declaration and location procedure in the private network for said mobile terminals employing the first standard; and perform a conversion between a signaling protocol employing the first standard and a signaling protocol accepted by the private automatic branch exchange.

2. A system enabling use of mobile telephone terminals employing a first standard in a private telecommunication network employing a second standard, said network including at least one private automatic branch exchange, a plurality of mobile telephone terminals employing said second standard, a plurality of base stations employing said second standard having input-output ports connected to input-output ports of the private automatic branch exchange, and said input-output ports having an interface specific to said base stations to the second standard, the system includes, the system comprising:

a radio transceiver employing said first standard and connected via a wireless communication link to said mobile terminals employing said first standard;

a base station controller employing said first standard and connected to said radio transceiver;

a terminal emulation system connected via a cable link to said private automatic branch exchange of said private network, said terminal emulation system emulating terminals employing said second standard; and a converter communicably linked between said base station controller and said terminal emulation system, said converter configured to:
  perform a declaration and location procedure in said private network for said mobile terminals employing said first standard, and
  perform conversion between a signaling protocol employing said first standard and a signaling protocol accepted by said private automatic branch exchange.

3. The system as claimed in claim 1, wherein said converter is further configured to carry out transcoding between a speech code of said first standard and a speech code accepted by said private automatic branch exchange.

4. The system as claimed in claim 2, wherein said converter is further configured to carry out transcoding between a speech code of said first standard and a speech code accepted by said private automatic branch exchange.

* * * * *